United States Patent [19]
Murray

[11] Patent Number: 5,433,608
[45] Date of Patent: Jul. 18, 1995

[54] VEHICLE SIMULATOR AND METHOD FOR CONTROLLING A VEHICLE SIMULATOR

[75] Inventor: Paul M. Murray, Kent, United Kingdom

[73] Assignee: Thomson Training & Simulation Limited, Sussex, United Kingdom

[21] Appl. No.: 108,706

[22] PCT Filed: Nov. 26, 1991

[86] PCT No.: PCT/GB91/02088
§ 371 Date: Sep. 13, 1993
§ 102(e) Date: Sep. 13, 1993

[87] PCT Pub. No.: WO92/16923
PCT Pub. Date: Oct. 1, 1992

[30] Foreign Application Priority Data
Mar. 20, 1991 [GB] United Kingdom ............ 9105875

[51] Int. Cl.$^6$ ........................... G09B 9/02
[52] U.S. Cl. ................... 434/29; 434/30; 434/40; 434/44; 434/55
[58] Field of Search ............ 434/40, 45, 30, 33, 434/38, 29, 44, 55, 69

[56] References Cited

U.S. PATENT DOCUMENTS

| | | | |
|---|---|---|---|
| 2,442,297 | 5/1948 | Link, Jr. | 434/44 |
| 3,114,979 | 12/1963 | Fox . | |
| 3,295,224 | 1/1967 | Cappel . | |
| 3,718,989 | 3/1973 | McKnight . | |
| 3,732,630 | 5/1973 | Crosbie et al. | 434/40 |
| 4,350,489 | 9/1982 | Gdovin | 434/40 |
| 4,473,355 | 9/1984 | Pongratz | 434/44 |
| 4,631,863 | 12/1986 | Reed | 434/40 X |
| 5,182,150 | 1/1993 | Carlos et al. | 428/35.7 |

FOREIGN PATENT DOCUMENTS
| | | |
|---|---|---|
| 2623648 | 5/1989 | France . |
| 2101948 | 1/1983 | United Kingdom . |

OTHER PUBLICATIONS
Aviation Week and Space Technology, *Training Program*, pp. 54–70; 20 Feb. 1989.
S. Sexton et al, Rediffusion Simulation Limited, *Satisfactory Visual and Motion cueing For Helicopter/VSTOL Simulation*, pp. 11.1–11.19.

*Primary Examiner*—Gene Mancene
*Assistant Examiner*—Jeffrey A. Smith
*Attorney, Agent, or Firm*—Nixon & Vanderhye

[57] ABSTRACT

A vehicle simulator is disclosed in which a first motion platform is driven in translation and rotation from a datum position. A simulator user station is positioned on the first motion platform, the user station defining a predetermined eyepoint position and a predetermined field of view from the eyepoint position relative to the user station. A display surface is mounted on a second motion platform so as to lie within the field of view, and the second motion platform is driven to maintain a predetermined positional relationship between the eyepoint position and the display surface. An image is projected to be viewed from the eyepoint position via the display surface. The display surface is substantially spherical and the second motion platform is driven, in response to translations of the eyepoint position, so that the location of the eyepoint position relative to the center of the spherical display surface is substantially constant and, in response to rotations of the first motion platform about the eyepoint position, so that the second motion platform is maintained substantially stationary. The display surface extends to a perimeter that is outside the predetermined field of view for any possible rotations of the first motion system about the eyepoint position.

5 Claims, 11 Drawing Sheets

FIG. 1 (PRIOR ART)
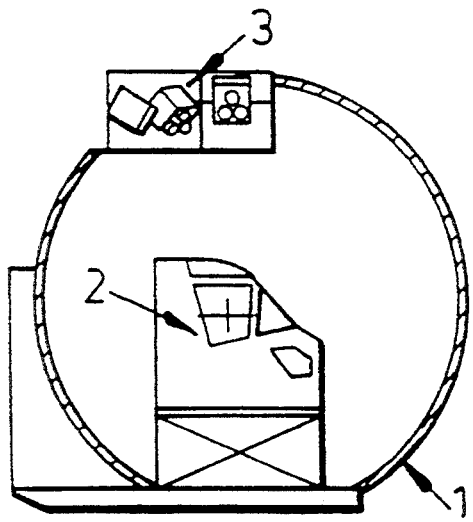
FIG. 2 (PRIOR ART)
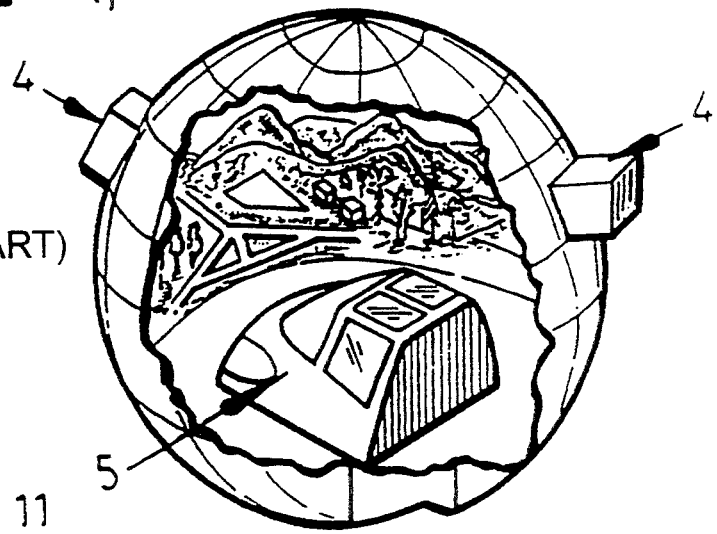
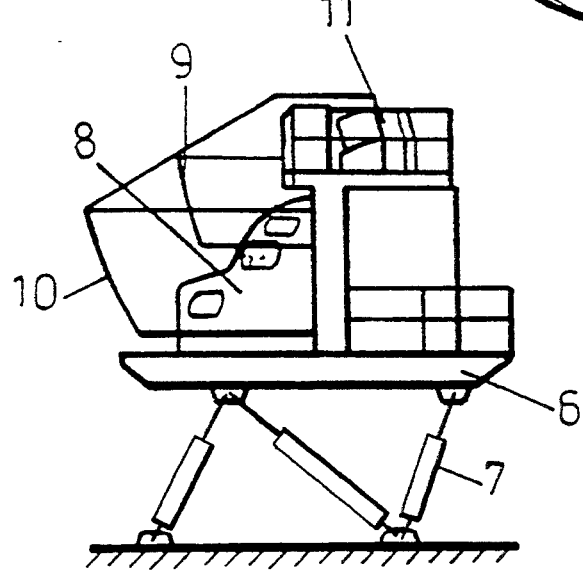
FIG. 3 (PRIOR ART)

VEHICLE SIMULATOR AND METHOD FOR CONTROLLING A VEHICLE SIMULATOR

BACKGROUND OF THE INVENTION

1. Field of the Invention

The present invention relates to a vehicle simulator. Vehicle simulators are widely used in training or entertainment applications. One major area of use is in the training of aircraft pilots.

2. Related Art

In a typical aircraft flight simulator, a trainee pilot sits in a mock cockpit and views an image visible to him through the cockpit windows. Often the mock cockpit is supported on a motion platform so that the physical effects of vehicle motion can be simulated to supplement the simulation of aircraft motion represented by the visual image. Typically the mock cockpit is supported on a rigid platform that is itself supported on six hydraulic jacks. The hydraulic jacks are connected between three pivots on the underside of the platform and three pivots on a support base beneath the platform. Thus each platform pivot is connected to two jacks which are in turn connected to respective ones of a pair of the support base pivots. This conventional jack system provides six degrees of freedom and is the industry standard for motion platform support systems.

A variety of visual systems have been proposed for use in vehicle simulators. Generally such visual systems can be divided into two types, that is uncollimated and collimated.

In uncollimated systems, an image to be viewed by the simulator user is projected on to a screen or dome placed in front of the mock cockpit. The screen surface is typically between three and six meters from the simulator user's eyepoint and thus such systems are not ideally suited to portray images representing distant objects. Uncollimated systems are however often used where very wide fields of view are required as it is difficult to project images showing very wide fields of view using collimated systems. Uncollimated systems are also sometimes favoured for simulating vertical take off aircraft where it is necessary to train pilots in very low altitude manoeuvres. In such circumstances the short distance between the screen and the user's eyepoint is not a major disadvantage.

In collimated systems, the user is presented with an image which appears to be at infinity. In one type of widely used collimated system, the windows of the mock cockpit are covered by a television monitor arrangement incorporating beam splitters such that rays of light from the television monitor are reflected in a partially reflective mirror to a concave mirror and from the concave mirror back through the partially reflective mirror to the users eyepoint, Such arrangements present an appropriate image only to a user in one position and are therefore not ideal for multi-occupancy cockpit simulations as required for example for wide-bodied jets, They are used for such applications however despite the fact that two users sitting side by side only receive an appropriate image through the immediately adjacent front and side windows. A user looking towards a side or front window on the opposite side of the cockpit sees either a very distorted image or no image at all.

Collimated wider angle visual systems are known in which the cross-cockpit image problem referred above is avoided, In such systems an image is projected onto a back projection screen placed above the mock cockpit and viewed via a concave mirror placed front of the mock cockpit. The mirror is typically two or three meters away from the front of the mock cockpit but nevertheless presents an image which appears to be at infinity, Such systems now represent the majority of commercial aircraft flight simulation system but are not ideal for military aircraft simulation as the field of view in military aircraft is typically many times greater than that in civil aircraft.

The limited field of view problem referred to above can of course be overcome by increasing the size of the dome/mirror which represents the surface directly visible to the user, If the mock cockpit is stationary this is relatively easy to achieve but if the mock cockpit is mounted on a motion system the size and weight of the dome or mirror becomes a major problem as it to must be mounted on the motion system to maintain the essential geometry of the visual system.

The industry standard motion platform system referred to above typically comprises a platform mounted on six hydraulic actuators or jacks each having a stroke of about 1.5 m. Typical industry standard motion performances are set out in the following table:

|  | DISPLACEMENT | VELOCITY | ACCELERATION |
| --- | --- | --- | --- |
| Vertical | +85.1 cm<br>−95.3 cm | +61 cm/sec | +8 m/sec$^2$ |
| Longitudinal | +102.9 cm<br>−150.8 cm | +61 cm/sec | +6.1/sec$^2$ |
| Lateral | ±105.4 cm | ±61 cm/sec | ±6.1 m/sec$^2$ |
| Pitch | ±25.2° | ±20°/sec | ±120°/sec$^2$ |
| Roll | ±27.5 | ±20°/sec | ±120°/sec$^2$ |
| Yaw | ±32.5° | ±20°/sec | ±120°/sec$^2$ |

The positive and negative translational displacements in the vertical, longitudinal and lateral directions represent translational movement from a datum position to which the motion platform moves when powered up. The rotational displacements about the pitch, roll and yaw axes are also relative to axes passing thereof this datum rotation. Typically the motion platform weighs from 9000 to 12000 kg (20000 to 26000 lbs) and given the position of the motion centroid defined by the arrangement of the actuators the following typical inertia figures can be expected:

| Roll Inertia | 43000 Kg m$^2$ (32000 slug ft$^2$) |
| --- | --- |
| Pitch Inertia | 52000 Kg m$^2$ (38000 slug ft$^2$) |
| Yaw Inertia | 35000 Kg m$^2$ (26000 slug ft$^2$). |

The above figures apply for motion platforms supporting visual systems capable of presenting a wide angle image subtending a field of view of for example 40° vertically and 140° horizontally. In a wide bodied jet simulator, a field of view of these dimensions requires a mirror which defines part of the surface of a sphere, the vertical distance between the upper and lower edges of the mirror being typically of the order of 2 m and the horizontal distance between the side edges of the mirror being typically of the order of 5 m. Doubling the vertical field of view without any increase in the horizontal field of view obviously doubles the surface area of the mirror and the structure necessary to maintain dimensional stability for the mirror is necessarily massive. Such a structure could theoretically be built but only at the expense of substantially increasing the motion platform inertia. As a consequence, when very large fields of view are required, the traditional approach has been to dispense with the obvious advantages of a full motion system and rely instead upon a stationary mock cockpit located within a stationary display incorporating for example a dome. The mock cockpit can be mounted on a vibration platform or a g-seat can be used to deliver some displacement cues to the user but the resulting system is far less realistic than could be achieved using a full motion system.

A proposal has been made to overcome the problems inherent in the provision of large field of view visual systems on a motion platform by mounting the mock cockpit on a first motion platform and a display screen in the form of a dome on a second motion platform. This proposal was the subject of a disclosure in a paper entitled "Satisfactory Visual and Motion Cueing for Helicopters/VSTOL Simulation", by S. Sexton, R. Burbidge and Dr. M. Roberts of Rediffusion Simulation Limited. That paper was presented to the Royal Aeronautical Society in May 1990. In the disclosed system the mock cockpit is mounted on a conventional six degrees of freedom motion system supported on an inclined surface and a dome is mounted on an identical second conventional motion system mounted on a facing inclined surface. The advantage of this arrangement is firstly that the dome can extend beneath the mock cockpit so as to simulation of images relevant to helicopter landing procedures and secondly that the mechanical loading on the mock cockpit motion system is reduced by the transferral of the dome structure to the second motion system. In the disclosed system, the dome is substantially hemispherical and is disposed such that the motion system supporting the dome must be rotated about the eyepoint of a user in the mock cockpit in response to pitching motions of the mock cockpit about the users eyepoint if the lower edge of the hemisphere is to remain out of the field of view of the user. Thus a relatively small rotation of the mock cockpit about the users eyepoint can result in a requirement for the motion system supporting the dome to rotate the dome about the eyepoint so that the edges of the dome traverse substantial distances. For example, if the eyepoint to dome distance is of the order of 5 m an 18° rotation about the eyepoint requires a displacement of the edge of the hemisphere by more than 1 m. Clearly such displacements cannot be achieved sufficiently rapidly using standard motion system components given the large size of the display system components. Thus although the system described in the above paper has been put forward as a speculative solution to the problems associated with providing an integrated large field of view visual and motion system it has never been implemented. Alternative speculative solutions put forward in the same paper include the provision of secondary wide angle collimated displays independently mounted from a motion system, the provision of a very large static dome extending around the motion platform, and the mounting of a mock cockpit within a conventional motion platform supportive system so that the mock cockpit can be tilted relative to that motion platform.

BRIEF SUMMARY OF THE INVENTION

It is an object of the present invention to obviate or mitigate the problems outlined above.

According to the present invention there is provided a vehicle simulator comprising a first motion platform, means for driving the first motion platform in translation and rotation from a datum position, a simulator user station positioned on the first motion platform, the user station defining a predetermined eyepoint position and a predetermined field of view from the eyepoint position relative to the user station, a second motion platform, a display surface mounted on the second motion platform so as to lie within the field of view, means for driving the second motion platform to maintain a predetermined positional relationship between the eyepoint position and the display surface, and means for projecting an image to be viewed from the eyepoint position via the display surface, characterised in that the display surface is substantially spherical, the second motion platform driving means, in response to translations of the eyepoint position, drives the second motion platform so that the location of the eyepoint position relative to the centre of the spherical display surface is substantially constant and, in response to rotations of the first motion platform about the eyepoint position, maintains the second motion platform substantially stationary, and the display surface extends to a perimeter that is outside the predetermined field of view for any possible rotations of the first motion system about the eyepoint position.

The present invention is based on the realisation that providing the display surface is spherical and has an extent sufficient to cover all of the intended field of view regardless of the rotations that might be applied the first motion platform then it is not necessary for the display screen to track rotations about the eyepoint of the motion platform supporting the mock cockpit. The fact that the image displayed traverses the display surface as rotations occur does not affect the perceived realism of the projected image. Thus it is not necessary for the display screen to be displaced through large distances to track rotations of the cockpit motion platform but rather it is merely necessary for the geometrical centre of the display screen to be maintained in a predetermined position relative to the eyepoint defined within the mock cockpit.

Preferably the display surface is defined by a dome which substantially encloses the motion platform supporting the mock cockpit. The dome may be supported on an array of actuators disposed around the motion platform which supports the mock cockpit. The actuators may be arranged in three pairs each defining two sides of a respective triangle, each pair being connected between a support base and a ring structure on which the dome is mounted. If the support base is horizontal the display surface may be mounted on a substantially horizontal ring which is displaced so as to track translations of the eye point, the support ring for the display surface being maintained substantially horizontal at all times. This enables a relatively simple control of movements of the display screen. For example, for every position of the motion platform supporting the mock cockpit, the eyepoint can be calculated, and for every such eyepoint position a unique combination of control signals can be sent to the actuators supporting the display screen. The control system necessary for driving the display screen support system is thus relatively simple.

BRIEF DESCRIPTION OF THE DRAWING

Embodiments of the present invention will now be described, by way of example, with reference to the accompanying drawings, in which:

FIG. 1 is a schematic illustration of a stationary visual system in accordance with the prior art suitable for helicopter or VSTOL simulations;

FIG. 2 is a schematic illustration of a conventional stationary, visual system for presenting a very wide field of view;

FIG. 3 is a schematic illustration of a conventional motion platform mounted visual system incorporating a back projection screen viewed through a spherical mirror;

DESCRIPTION OF EXEMPLARY EMBODIMENTS OF THE INVENTION

Figure 4:
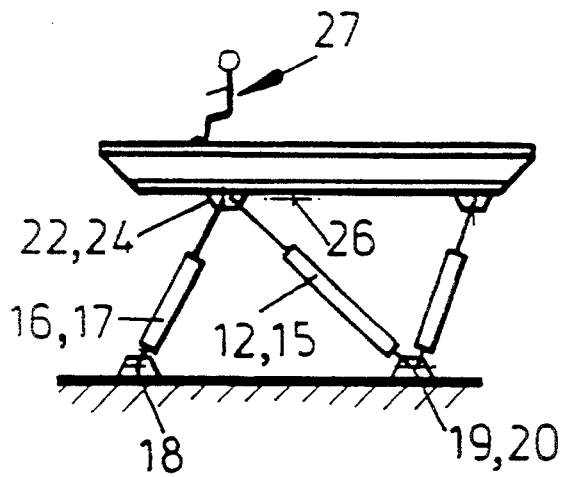
FIG. 4 is a schematic illustration of the basic components of a motion system of the type illustrated in FIG. 3.

Referring to FIG. 1, this illustrates a conventional fixed dome simulator in which a dome 1 having a radius of three to six meters is disposed around a stationary mock cockpit 2. Projectors, typically three or five in number, are located in a housing 3 so as to project image information onto the inner surface of the dome. The inner surface of the dome is viewed by a user located in the mock cockpit 2. With the exception of the area of the dome occupied by the projectors all of the interior surface of the dome can have images projected on to it and thus a wide field of view can be presented to the trainee pilot. The mock cockpit is however stationary, or at the most subjected to vibrations, and accordingly the user cannot receive motion cues. In general, this degrades the realism of the simulation.

The conventional arrangement of FIG. 2 is essentially very similar to that of FIG. 1 except for the fact that the projectors are distributed around the outer surface of the dome. Two projectors 4 are shown mounted on the dome. Each projector projects a cone of light through a very small aperture (known as a pin hole) in and thus an all round field of view can be achieved. Such an arrangement is suitable for simulating for example fighter aircraft in which the pilot is positioned beneath a transparent canopy giving unrestricted view upwards and through 360° around the aircraft. Again however the trainee pilot sits in a mock cockpit 5 which is stationary or at the most subjected to vibrations.

FIG. 3 illustrates a conventional motion system mounted simulator in which a motion platform 6 is positioned on an array of three pairs of hydraulic actuators 7. The simulator comprises a mock cockpit 8, a back projection screen 9 located above the mock cockpit, a spherical mirror 10, and an array of projectors 11 which produce an image on the screen 9. Such an arrangement gives a fully collimated image but the field of view in the vertical direction is restricted to typically of the order 40°. The field of view could be extended theoretically by increasing the size of the mirror 10 and displacing and enlarging the back projection screen 9 but the resulting structure would be very large as would be the mass and inertia carried by the motion system. The greater the mass and inertia of the system the less agile the motion system becomes.

Figure 5:
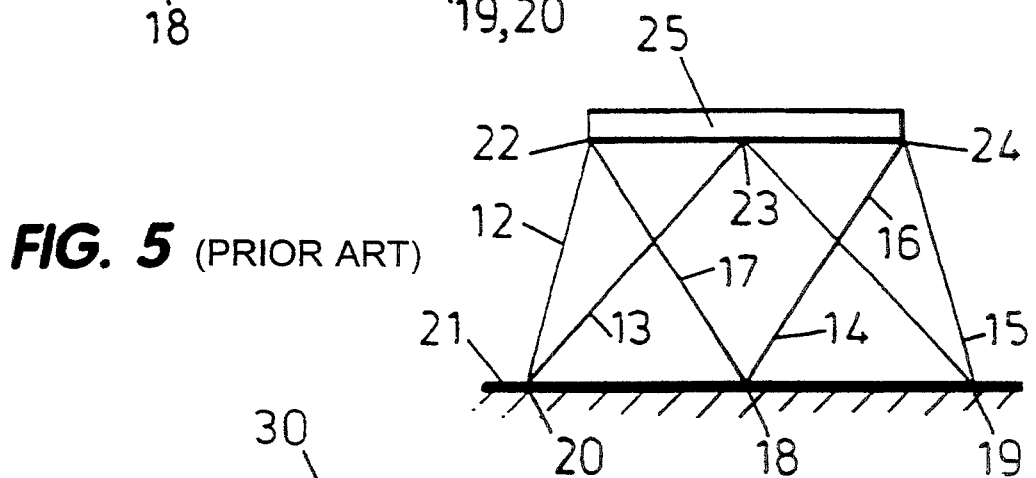
FIG. 5 is a schematic illustration of the arrangement of hydraulic actuators in a motion system of the type shown in FIG. 4.

Referring now to FIGS. 4 and 5, the basic components of a standard six degrees of freedom motion system of conventional type will now be described. Six actuators 12 to 17 are connected to three pivot points 18, 19 and 20 which are securely mounted on a supporting floor 21. The upper ends of the actuators are connected to pivot points 22, 23 and 24 mounted on the underside of a motion platform 25. The motion centroid of the system will typically be positioned where indicated by a cross 26 which is beneath and behind the position of a trainee pilot whose position is indicated by the FIG. 27. Translational displacements (vertical, longitudinal or lateral) and rotational displacements (pitch, roll and yaw) are determined by reference to the motion system centroid and axes through the centroid. Thus a simple pitching movement of the platform about the motion centroid will result in vertical and longitudinal translation of the eyepoint and a rotation displacement of the eyepoint.

In typical systems of the type described above with reference to FIGS. 1 to 5 either both the eyepoint and the visual system are stationary or both the eyepoint and the visual system move together on the same motion platform. Theoretically the fields of view of a motion platform mounted visual system can be made as large as required simply by mounting all of the visual systems components on a motion platform. For example in theory an arrangement such as that shown in FIG. 2 could be mounted on a motion platform. In practice, the mass and inertia of such an arrangement would be so large that the loading on the actuators would make it impossible for the motion system to move in an agile manner. Accordingly, although the theoretical possibility of mounting a system such as that shown in FIG. 2 on a motion platform has been discussed, it has been dismissed as being impractical.

Figure 6:
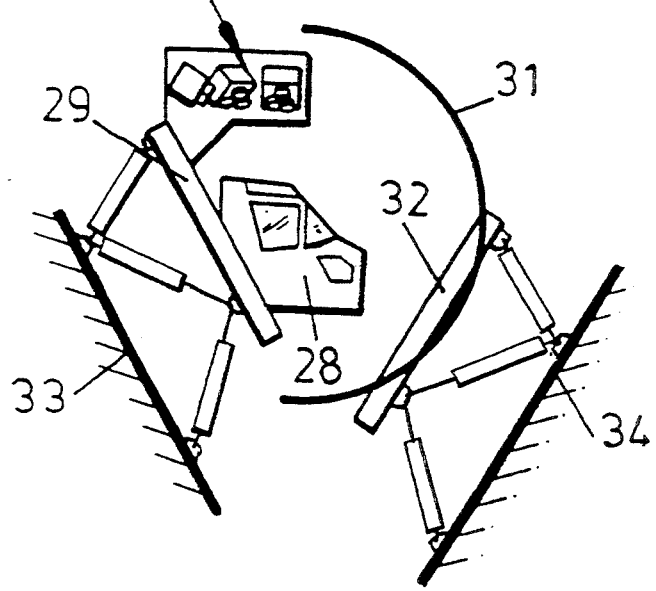
FIG. 6 is a schematic illustration of a prior art system in which a mock cockpit is mounted on one motion platform and a viewing dome is mounted on a second motion platform.

With a view to overcoming the mechanical loading problems associated with large component visual systems, it has been proposed to provide two motion platforms, one supporting a mock cockpit and the other supporting a large visual system component such as a dome. An arrangement of this type is illustrated in FIG. 6 from which it will be seen that a mock cockpit 28 is mounted on a motion platform 29 which also supports projectors 30. A dome 31 is mounted on second motion platform 32. One motion platform is mounted on a sloping surface 33 and the other on a facing sloping surface 34. This enables the dome 31 to extend beneath the mock cockpit in a manner appropriate for helicopter simulation applications. It will be noted however that the dome 31 only just covers the downwards field of view from the mock cockpit 28 in the orientation of the motion platform 29 as illustrated. Thus it is clear that the dome 31 must track all movements of the mock cockpit 28, both in translation and rotation, to maintain the dome so that it covers all the intended fields of view of the trainee pilot. For example a rotation of the mock cockpit 28 about the eyepoint of the trainee pilot in the pitch down direction would result in no translation or displacement but would bring the lower edge of the dome 31 in to the field of view unless the dome 31 was itself rotated about the eyepoint. The result of this is that the dome 31 must be capable of making very large movements in response to rotations of the mock cockpit about the trainee eyepoint. Thus although the system of FIG. 6 does reduce the mechanical loading on the first motion platform 29 the displacement requirements of the dome 31 are difficult to achieve. Furthermore although mounting two motion platforms on facing inclined surfaces a theoretical possibility it is difficult to envisage a practical system given the size and weight of the various components. The floor loadings applied by motion systems are very large and massive structures would be necessary to provide inclined supports of the type illustrated in FIG. 6.

Figure 7:
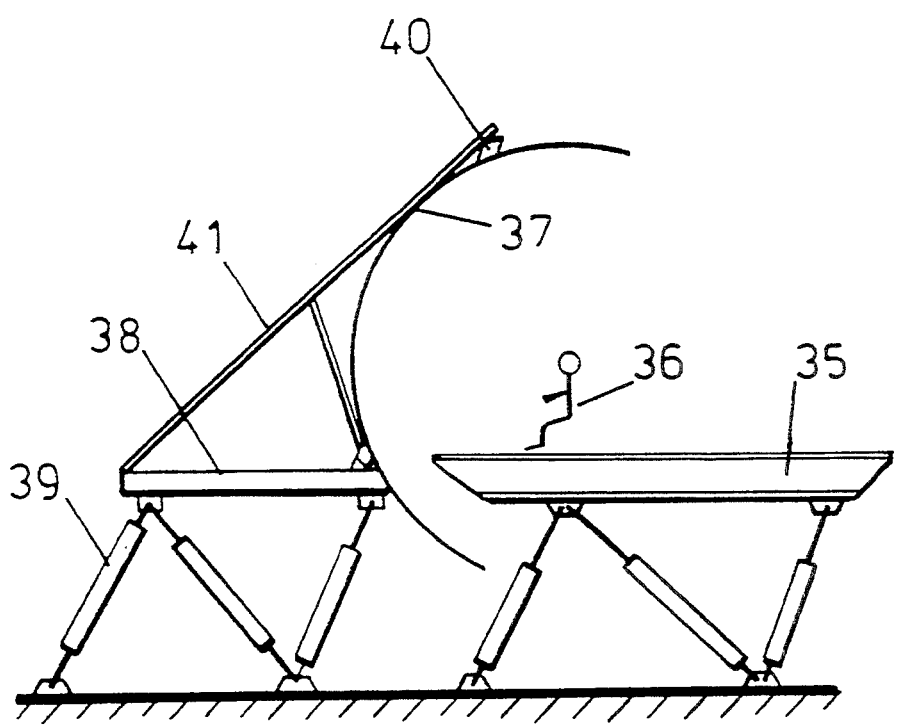
FIG. 7 is a schematic illustration of a first embodiment of the present invention.

Referring to FIG. 7, this illustrates a first embodiment of the present invention. A motion platform 35 of standard type supports a mock cockpit (not shown) within which a trainee pilot indicated by FIG. 36 is seated. Projection devices (not shown) are mounted on platform 35 and project an image to be viewed by the trainee pilot onto a dome 37 supported on a second motion platform 38 mounted on hydraulic actuators 39. The hydraulic actuators 39 are of conventional form.

The dome 37 is arranged such that for the correct display of an image the centre of the dome must be co-located with the eyepoint of the trainee pilot. The platform 38 is controlled however such that it is always substantially horizontal regardless of the position of the motion platform 35. The only control constraint on the movement of the dome 37 is that the centre of the dome is always coincident with the intended trainee pilots eyepoint. Thus the dome 37 is sufficiently large that its perimeter is always outside the intended field of view of the trainee pilot regardless of the rotations which might be applied to the platform 35. For example if the platform 35 is pitched downwards so that there is no translational displacement of the pilots eyepoint but there is rotation about the eyepoint the dome 37 will not move at all. The image projected by the projectors mounted on the platform 35 will simply sweep across the spherical surface defined the dome 37 but there will be no perceived effect so far as the trainee pilot is concerned.

Thus in the case of the embodiment of FIG. 7 movements the dome 37 are relatively limited and easy to control. It is simply necessary to compute the intended eyepoint position and apply a unique set of control inputs to the six actuators 39 for the dome 37 to assume the appropriate position. The motion system 35 does not therefore have to support the load of the dome 37 and can therefore move in an agile manner. The dome 37 does not itself have to move at all in response to rotations about the pilots eyepoint and generally relatively slow displacements of the dome 37 are all that is required.

In the arrangement of FIG. 7, two motion systems are placed one in front of the other. This demands a large amount of space. Furthermore the dome 37 must be supported so as to extend a considerable distance from one side of its supporting platform, necessitating a structural support system such as a support ring 40 mounted on a space frame 41 as schematically illustrated. A more satisfactory arrangement which can also provide a very wide field of view is illustrated with reference to FIG. 8.

Figure 11:
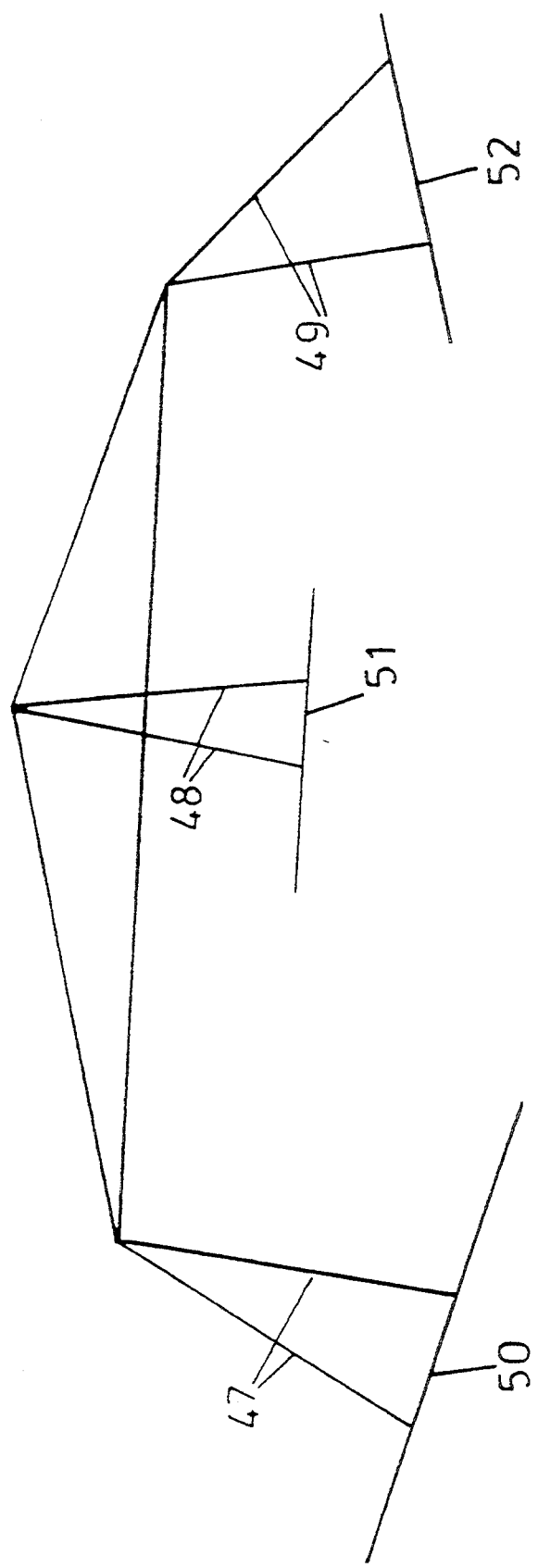

Referring to FIGS. 8 to 12, the second embodiment of the present invention will now be described. In this second embodiment, a conventional first motion platform 42 supporting a trainee pilot indicated by the FIG. 43 is mounted on a conventional arrangement of six hydraulic actuators 44. Disposed around the first motion platform is a dome 45 which is mounted on a ring 46 supported on three pairs of hydraulic actuators 48 and 49. The bottom end of each actuator is connected to a respective floor mounted pivot and the top ends of each pair of actuators are connected to a common pivot mounted on the ring 46. To simplify the drawing the structure of these pivots is not illustrated. It will be noted that horizontal lines 50, 51 and 52 drawn through the bottom pivots of the pairs of actuators are displaced radially outwards from the sides of the dome so that when the dome is in its initial rest position as shown in dotted lines in FIG. 12 and full lines in FIG. 10 all of the actuator pairs lean inwards. The support system thus comprises three support triangles each connected to a ring which can be considered as defining a further structural triangle as illustrated in FIG. 11.

Figure 12:
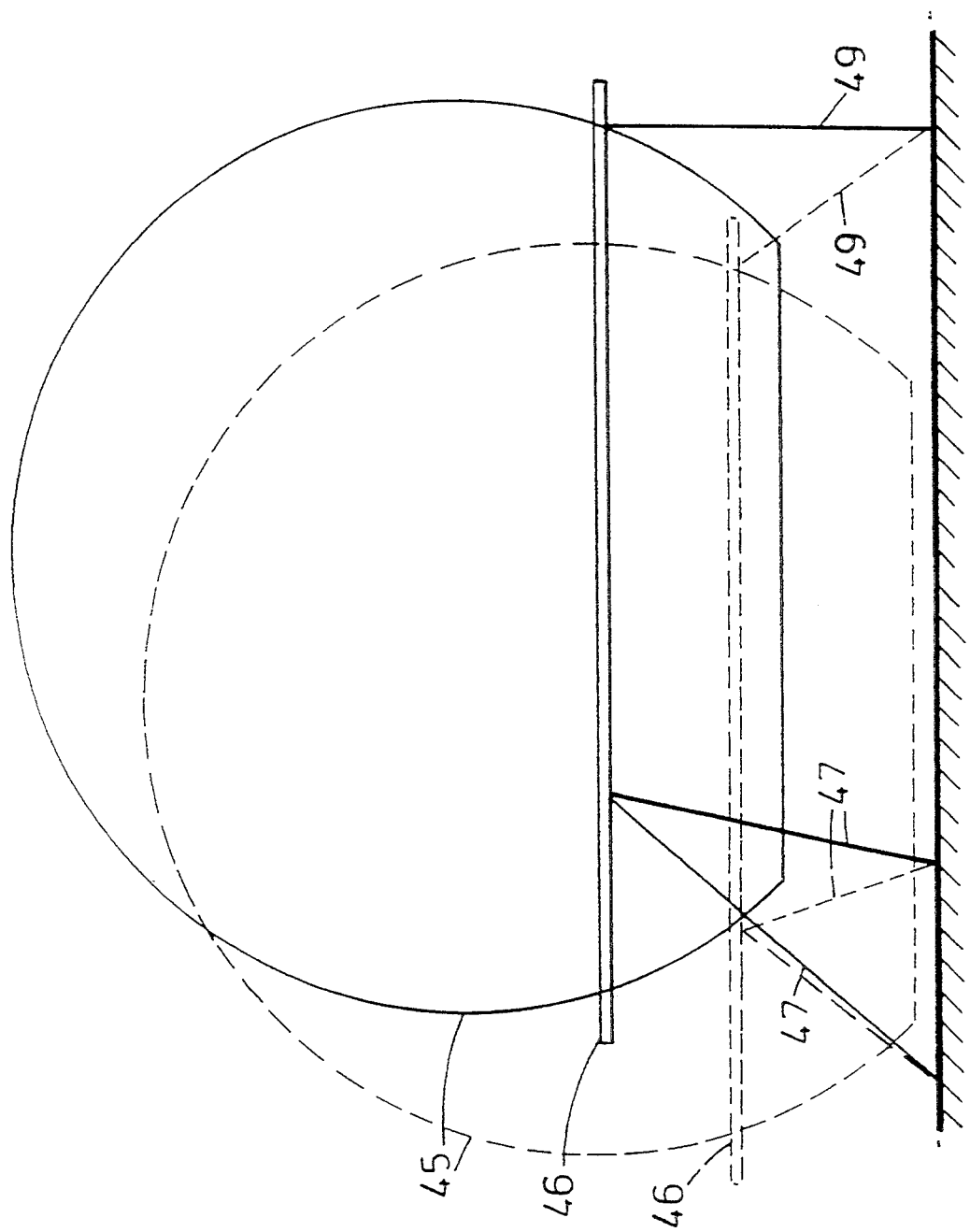

FIG. 12 shows in full lines the dome 45 in a displaced position such that the actuators 49 are substantially vertical. It will be noted however that the ring 46 remains substantially horizontal. Thus although if desired it would be possible to rotate the dome 45 it is not necessary providing the vertical and horizontal displacements which can be accommodated by the actuators is sufficient to maintain the centre of the spherical dome 45 coincident with the eye point of the trainee pilot supported on the first (inner) motion platform 42.

Although in the arrangement illustrated in FIGS. 8 to 12 the lines 49, 50 and 51 are displaced outwards relative to the dome this is not necessarily the case and indeed the actuators could even in the rest position of the dome extend outwards from the floor up to the ring 46. Care would have to be taken however to ensure that with such an arrangement the actuators did not obstruct the lower portion of the dome.

It will be appreciated that with the arrangement to FIGS. 8 to 12 images covering a very wide field of view can be presented to a trainee pilot. Furthermore the system is relatively compact given that the dome 45 is supported on a motion system which is distributed around the inner motion system upon which the trainee pilot dome can be arranged such that when the actuators are not powered it simply settles onto the supporting floor surface. Access to the interior of the dome could be via a simple passageway cut into the supporting floor surface.

Figure 8:
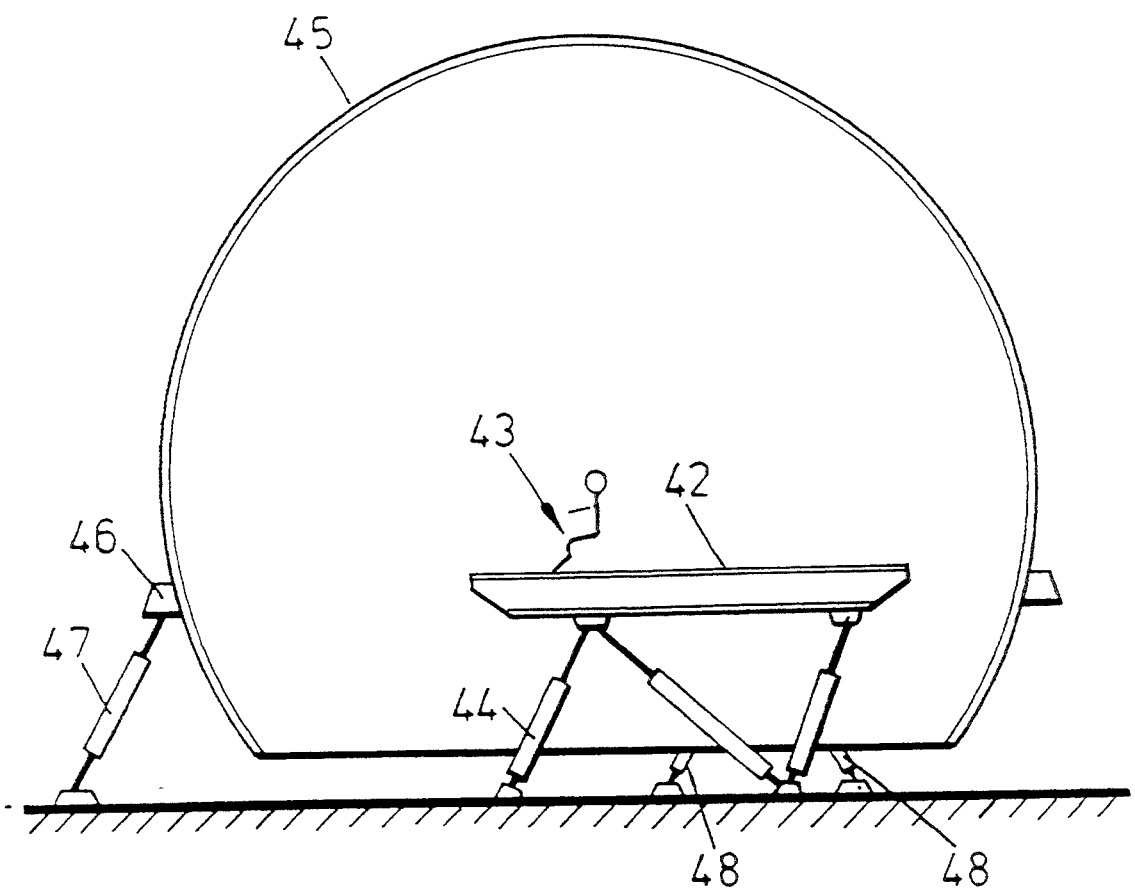
FIGS. 8 to 12 illustrate a second embodiment of the present invention.
Figure 9:
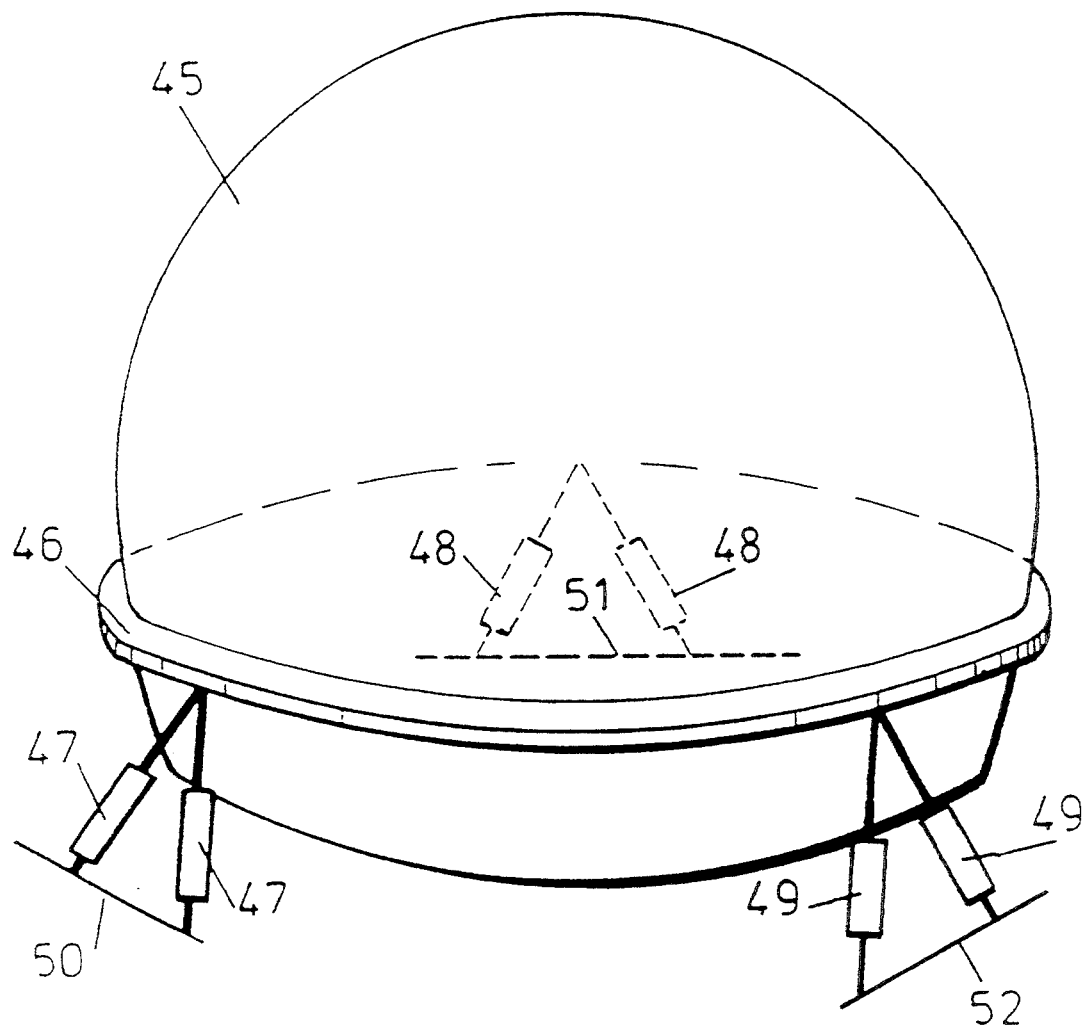
Figure 10:
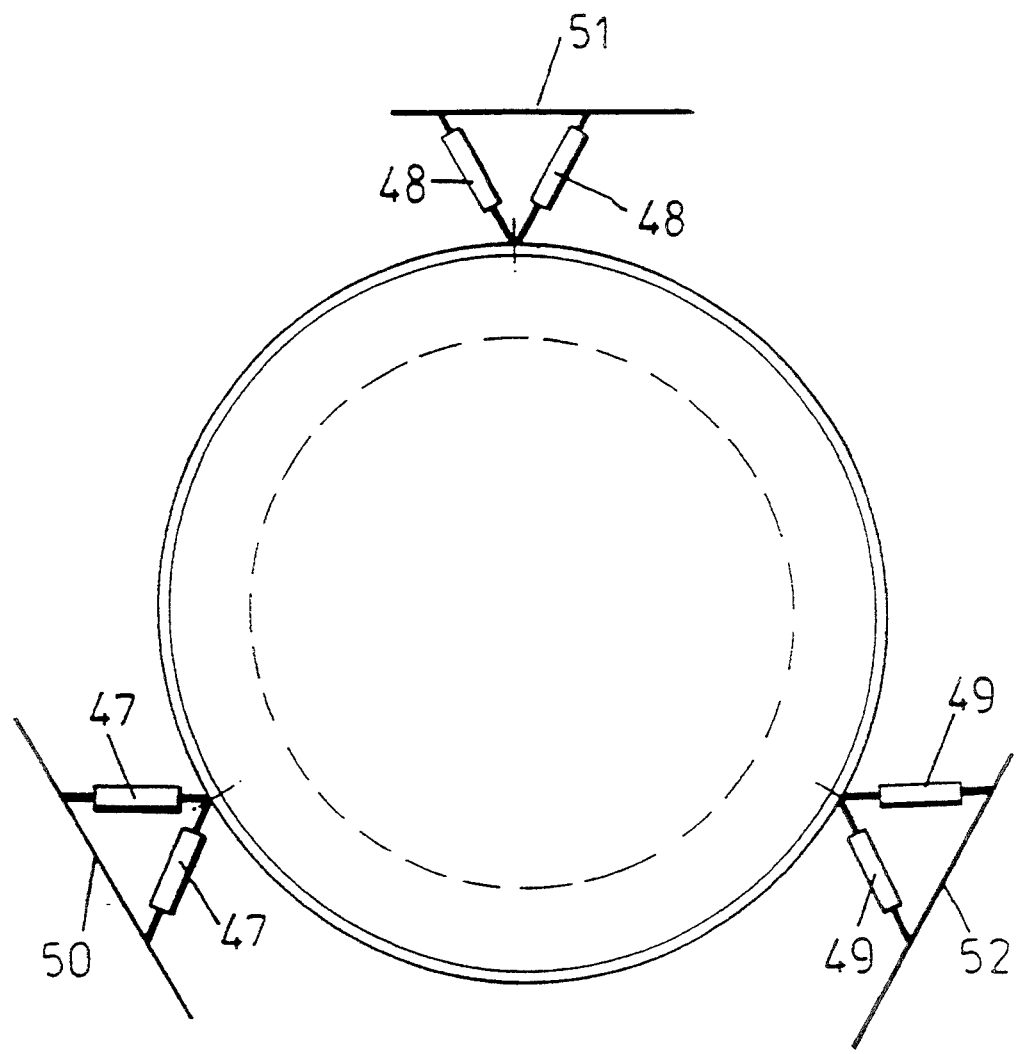
Figure 13:
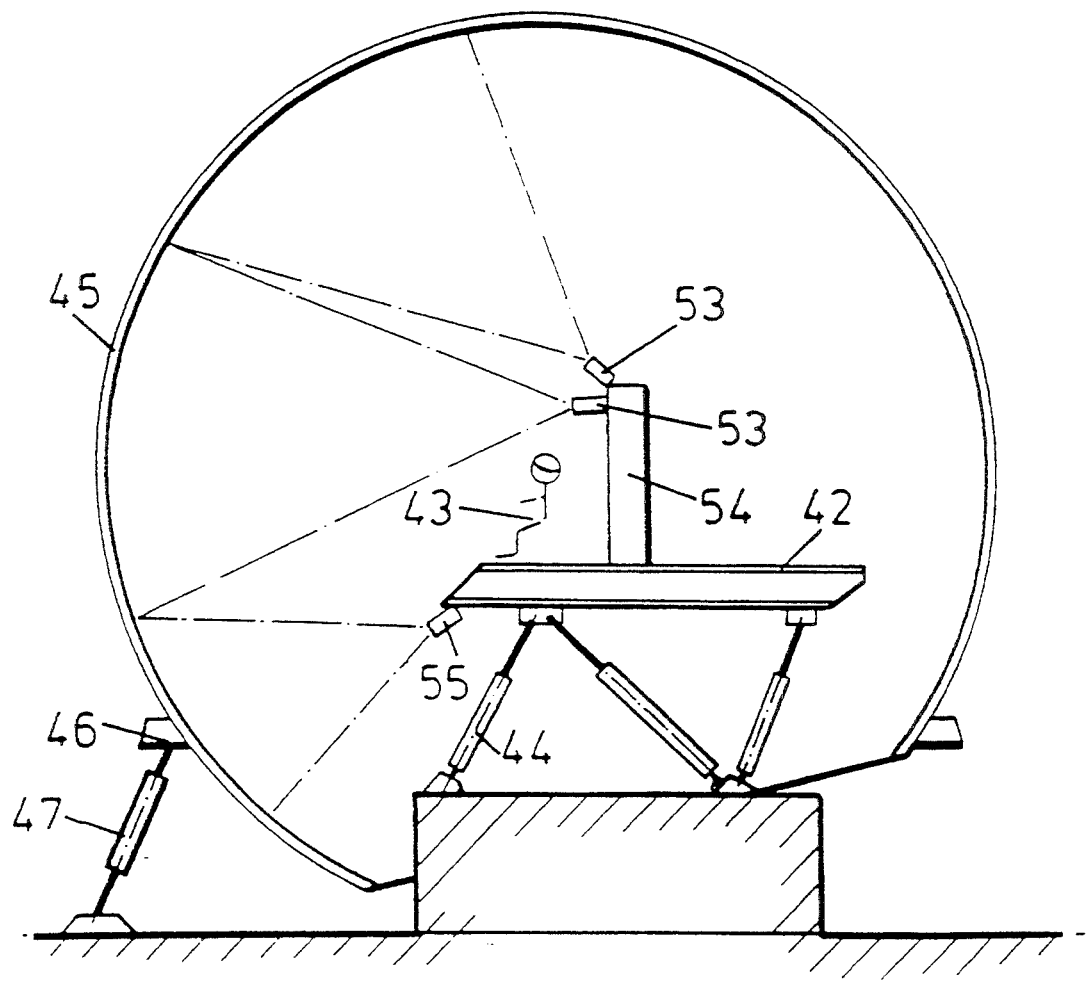
FIG. 13 is a schematic illustration of a third embodiment of the present invention.
Figure 14:
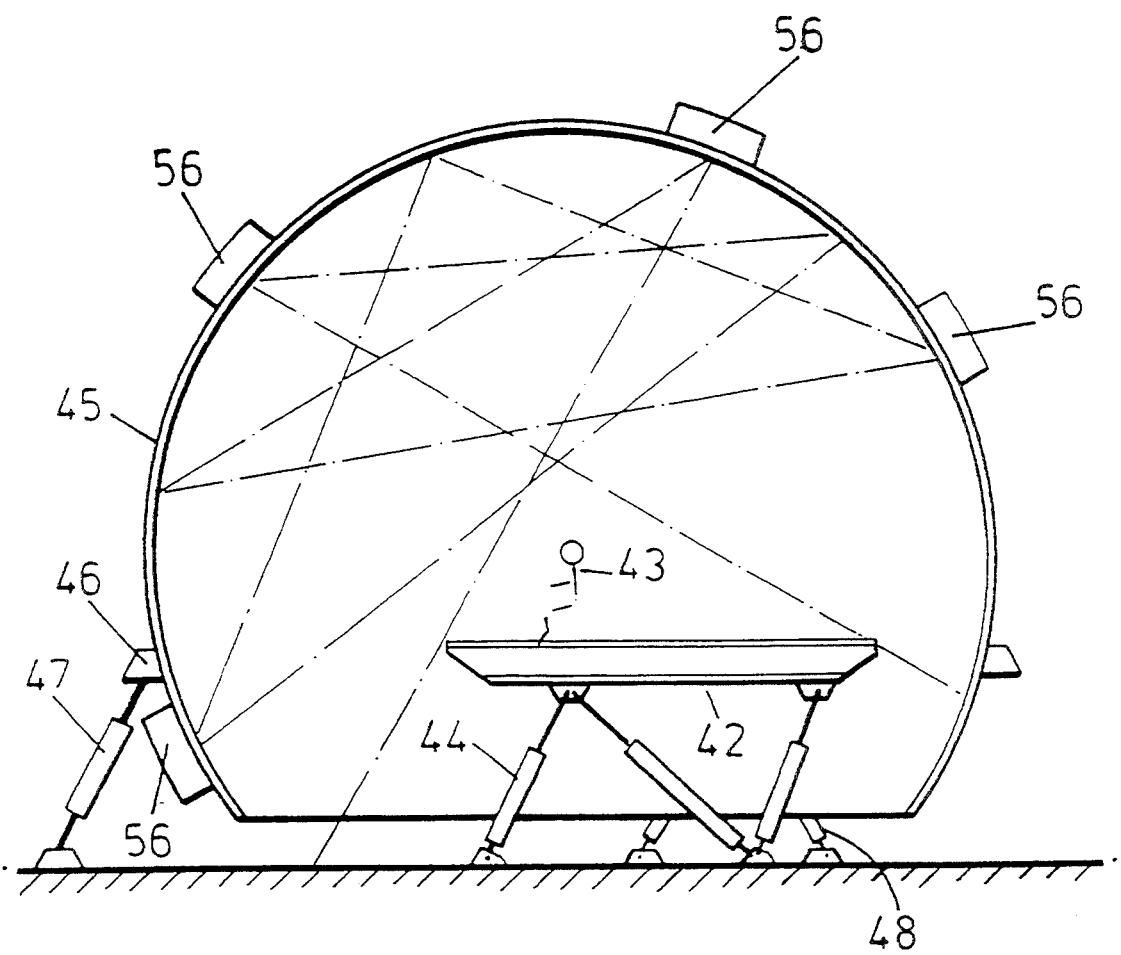
FIG. 14 is a schematic illustration of a fourth embodiment of the present invention.

With the arrangements of FIGS. 8 to view is restricted somewhat given that the dome and motion platform are mounted on the same surface and the motion platform cannot driven below that surface. The downwards field of view can however be readily extended by supporting the trainee pilot motion system on a plinth located within the dome as illustrated in FIG. 13. The same reference numerals are used in FIG. 13 as in FIG. 8 for the same components. The arrangement of FIG. 13 also shows schematically projectors 53 mounted on a suitable support 54 behind the trainee pilot position. Such a projector arrangement would normally be envisaged in an arrangement of the type illustrated in FIGS. 8 to 12. In the case of FIG. 13 however additional projectors 55 are provided beneath the motion platform so as to extend the area of the dome 45 upon which images can be projected. A wide field of view with a particularly good downwards field of view can thus be achieved. Most of the dome behind the pilot does not carry image information but is nevertheless provided simply for structural reasons. If however it was desired to give the pilot the ability to look behind him, as would be desirable in a fighter aircraft simulator an arrangement such as that shown in FIG. 14 could be provided in which again the same reference numerals are used where appropriate. In the case of FIG. 14, the dome 45 supports an array of projectors 56 each projecting a cone of light through a small pin hole in the dome. By appropriate distribution of the projectors 56 substantially any desired field of view can be supported.

Figure 15:
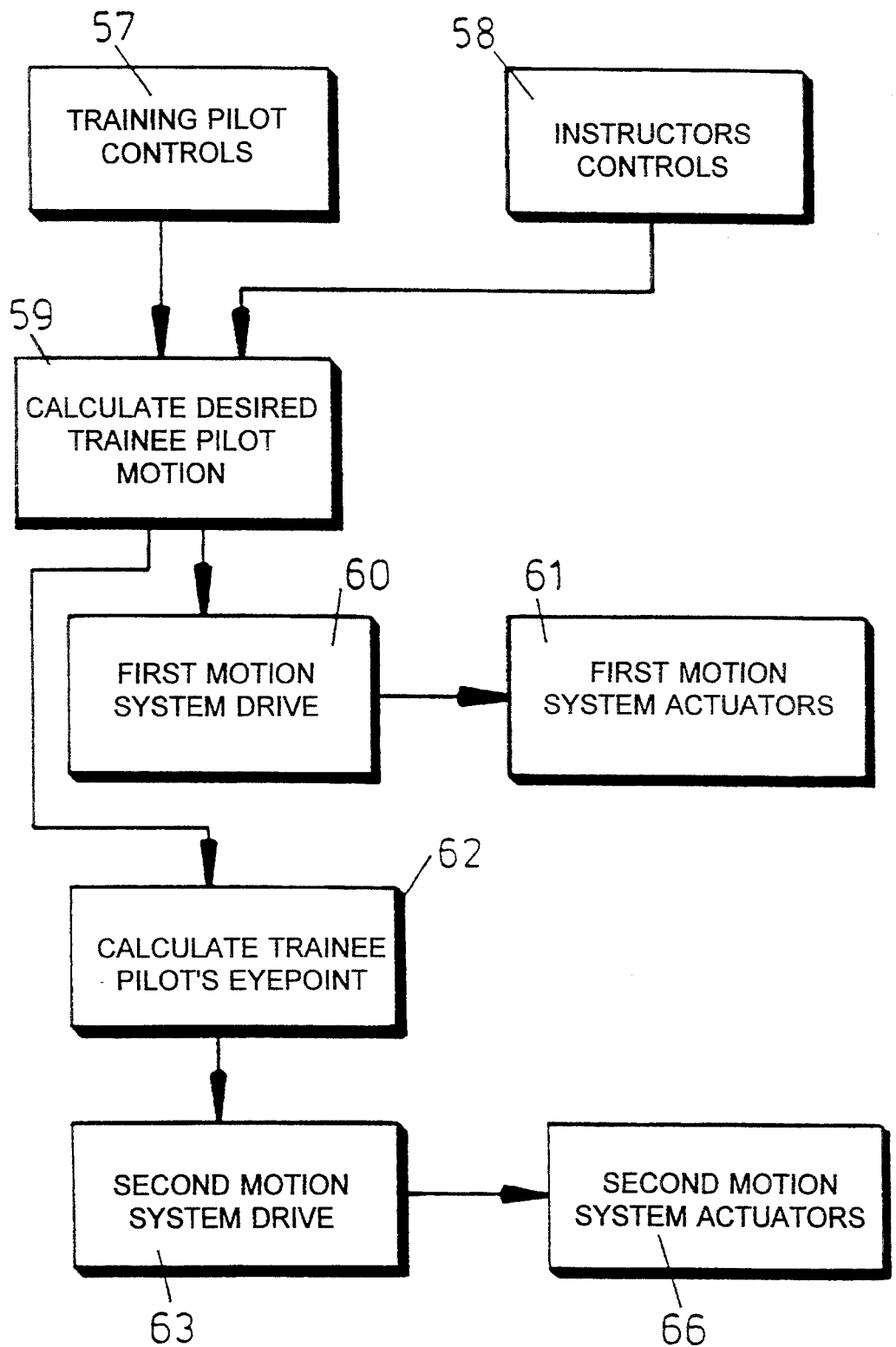
FIG. 15 is a schematic illustration of a control system for any of the described embodiments of the invention.

Referring now to FIG. 15, this schematically illustrates the control system used in any of the above described embodiments of the present invention. It is fundamental to the control system that the dome is arranged to track displacements but not rotations of the users eye point. Thus the user such as the trainee pilot manipulates controls 57 to which the simulator is intended to be responsive. In addition an instructor may manipulate controls 58 to affect the simulator in ways intended to enhance pilot training. From these control inputs a computer system 59 calculates the desired trainee pilot motion in a conventional manner. Once that motion has been calculated a first motion system drive 60 is caused again in a conventional manner to control the motion of first motion system 61 upon which the trainee pilot sits. Thus far the system is entirely conventional. In accordance with the present invention however a computer 62 calculates the trainee pilots eye point position given the pilot motion which is demanded by the control inputs. From the calculated trainee pilot's eye point position control outputs are derived which cause a second motion system drive 63 to drive the motion system actuators 64 which support the dome. Thus the dome drive can be entirely independent of rotations of the pilot's eye point, taking advantage of the fact that such rotations do not affect the perceived image given that the image simply sweeps across the spherical inner surface of the dome.

It will be appreciated that although embodiments of the present invention have been described in which images to be viewed are projected onto a dome it would be possible to support for example a spherical mirror of a collimated visual system in a similar manner to that described for the support of a spherical display dome.

I claim:

1. A vehicle simulator comprising:
   a first motion platform,
   means for driving the first motion platform in translation and rotation from a datum position,
   a simulator user station positioned on the first motion platform, the user station defining a predetermined eyepoint position and a predetermined field of view from the eyepoint position relative to the user station,
   a second motion platform,
   a display surface mounted on the second motion platform so as to lie within the field of view,
   means for driving the second motion platform to maintain a predetermined positional relationship between the eyepoint position and the display surface,
   means for projecting an image to be viewed from the eyepoint position via the display surface,
   the display surface being substantially spherical,
   the second motion platform driving means, in response to translations of the eyepoint position, including means for driving the second motion platform so that (a) the location of the eyepoint position relative to the centre of the spherical display surface is substantially constant and, (b) in response to rotations of the first motion platform about the eyepoint position, the second motion platform is maintained substantially rotationally stationary relative to said eyepoint position,
   the display surface extending to a perimeter that is outside the predetermined field of view for any possible rotations of the first motion system about the eyepoint position.

2. A vehicle simulator comprising:
   a first motion platform,
   means for driving the first motion platform in translation and rotation from a datum position,
   a simulator user station positioned on the first motion platform, the user station defining a predetermined eyepoint position and a predetermined field of view from the eyepoint position relative to the user station,
   a second motion platform,
   a display surface mounted on the second motion platform so as to lie within the field of view,
   means for driving the second motion platform to maintain a predetermined positional relationship between the eyepoint position and the display surface, and
   means for projecting an image to be viewed from the eyepoint position via the display surface,
   the display surface being substantially spherical,
   the second motion platform driving means, in response to translations of the eyepoint position, driving the second motion platform so that the location of the eyepoint position relative to the centre of the spherical display surface is substantially constant and, in response to rotations of the first motion platform about the eyepoint position, maintaining the second motion platform substantially rotationally stationary relative to said eyepoint position,
   the display surface extending to a perimeter that is outside the predetermined field of view for any possible rotations of the first motion system about the eyepoint position, and
   wherein the display surface extends around the first motion system and is supported on second motion system actuators which are distributed around the periphery of the first motion system.

3. A vehicle simulator according to claim 2, wherein the actuators are arranged in three pairs each defining two sides of a respective triangle, each pair being connected between a support base and a ring structure on which the display surface is mounted.

4. A vehicle simulation according to claim 3, wherein the ring structure is maintained substantially horizontal at all times.

5. A method for controlling a vehicle simulator having a first controllable motion platform supporting a simulator user station and a second controllable motion platform supporting an image display surface, said method comprising the steps of:

moving said first controllable motion platform in three mutually orthogonal translational motions and in three rotational motions; and moving said second controllable motion platform in only three mutually orthogonal translational motions while maintaining a predetermined relationship between the location of a predetermined point associated with the simulator user station and a predetermined point associated with the image display surface.

* * * * *